Nov. 9, 1954     F. G. CARPENTER ET AL     2,693,706
METHOD OF AND GRADED SPHERES FOR CALIBRATION OF SIEVES
Filed Sept. 5, 1951
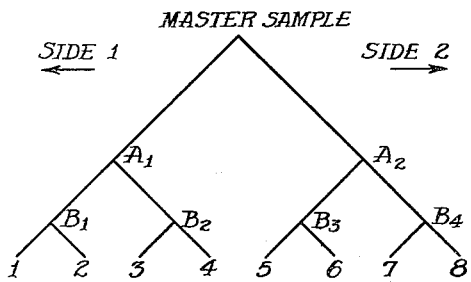
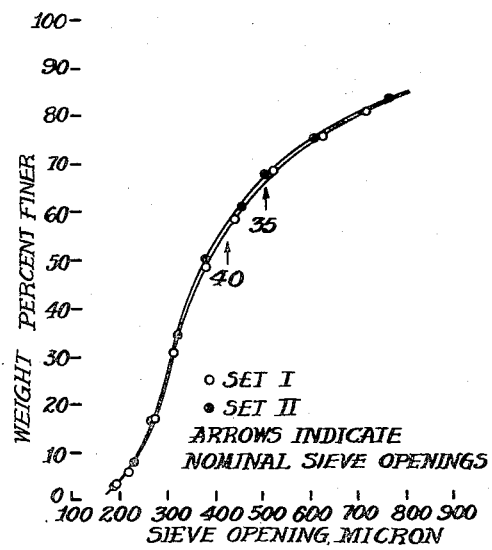
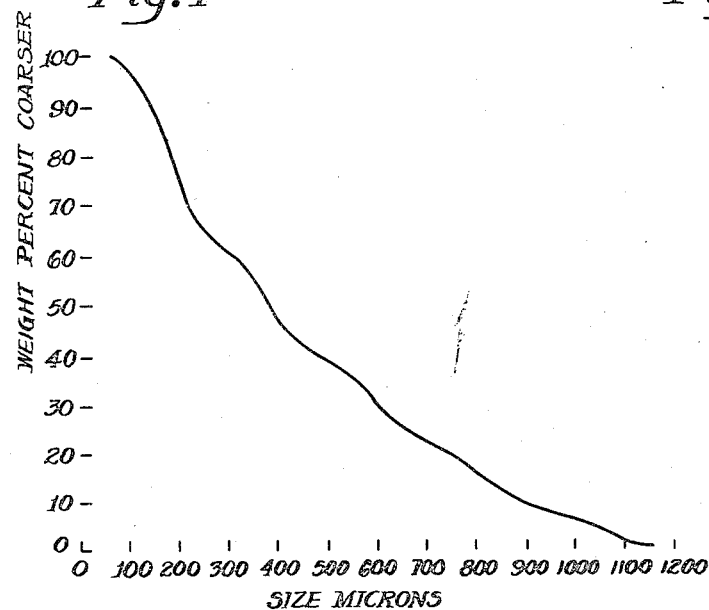
Fig. 1
Fig. 2
Fig. 3
INVENTOR.
Victor R. Deitz
BY Frank G. Carpenter
Max L. Libman
ATTORNEY

United States Patent Office 2,693,706
Patented Nov. 9, 1954

2,693,706

METHOD OF AND GRADED SPHERES FOR CALIBRATION OF SIEVES

Frank G. Carpenter, Kensington, Md., and Victor R. Deitz, Washington, D. C., assignors to the United States of America as represented by the Secretary of Commerce Application September 5, 1951, Serial No. 245,226

5 Claims. (Cl. 73—432)

(Granted under Title 35, U. S. Code (1952), sec. 266)

The invention described herein may be manufactured and used by or for the Government of the United States for governmental purposes without the payment to us of any royalty thereon in accordance with the provisions of the act of March 3, 1883, as amended (45 Stat. 467; 35 U. S. C. 45).

The present invention is concerned with the development of a method for standardizing testing sieves by the use of a calibrated sample of spherical beads.

Sieve analysis is one of the basic tests for measuring the particle size of all powdered and granular materials. In the cement, paint, abrasive, sugar, and many other industries, great importance is ascribed to sieve analyses in spite of the fact that their reproducibility may be extremely poor in comparison with other measurements such as volume, mass, or chemical composition. Differences in the results of sieve analysis of the order of magnitude of 10 percent are frequently reported between different laboratories while differences of 1 or 2 percent are not uncommon with the same operator and the same sieving equipment. These discrepancies are sometimes due to inadequate sampling procedures; however, the greatest source of error in sieve analysis seems to be the evaluation of the size of the openings of the sieve.

At present, testing sieves are calibrated by determining the average opening in the sieve. This is done by measuring the thickness of the wires in the mesh and counting the number of openings per inch usually for a distance of at least 6 inches. The average opening is then determined by dividing the difference between the total distance measured and the sum of all wire diameters in this distance by the number of openings. This procedure requires equipment and techniques that many users of sieves do not possess. Moreover, for non-uniform sieves, the size of the "average" opening has no significance because the largest openings determine the fineness of the material that the sieve will pass. In fact it is entirely possible that not a single opening in the sieve will correspond to the size of the average opening. It can be seen from this that two sieves having the same average opening may have entirely different "effective" openings. For an extreme example, consider two sieves with an average opening of say 50 microns. One might have the openings grouped closely around 50 microns while the other sieve might have half the openings grouped around 40 microns and the other half grouped around 60 microns. As a result, although both have the same average opening, 50 microns, the second sieve will behave as if the openings were all very close to 60 microns. Therefore, two sieves found to be of the same size according to the present system of calibration might give greatly varying results in actual use.

It is therefore the primary object of this invention to provide a method of calibrating sieves according to their effective openings.

Another object is to provide samples of graded spheres to be used in calibrating sieves by determining their effective openings.

Another object is to provide a means for calibrating the size of the sieve opening without recourse to observations made with a microscope.

Still another object of the invention is to develop a procedure whereby a sieve analysis made in one laboratory with one set of sieves can be made to agree with a second sieve analysis of the same material in another laboratory with a second set of sieves.

Another object of the invention is to improve upon the accuracy of calibration of testing sieves by measuring the effective opening rather than the average opening of the sieve.

Another object is to allow the calibration of sieves to be done quickly and without special equipment by anyone familiar with sieving procedures.

Still another object is to provide a calibration procedure that will make it feasible to periodically check the sieves to determine whether wear or deformation has occurred to any appreciable extent.

In accordance with the present invention there are provided calibrated samples of spherical material of known particle size distribution which are used to calibrate the sieves according to the effective opening of the sieve. The particle size distribution of these samples is determined by means other than sieving.

Evaluation of the effective opening of a sieve with the spheres is easily accomplished by sieving a calibrated sample of the spheres in exactly the same manner as in the usual sieve analysis that is, the calibrated sample is subjected to the same shaking motion and for the same length of time as will be used for the unknown materials which are to be measured later. This sample contains a continuous distribution of sphere sizes. The weight percentage finer or coarser than the sieve is evaluated and the effective opening of the sieve can be read directly from a calibration curve supplied with the sample. Once the effective size of each of a set of sieves is known, all sieve analysis made with the set can be corrected by a simple graphical process to give the same values as a set of standard sieves.

Glass beads of the type used for highway markings have been found to be a suitable source of glass spheres from 80 to 1000 microns in diameter (U. S. sieves No. 170 through 18). These are processed so that the non-spherical beads are separated and these are not used. Next, the mixture of glass spheres is carefully selected to obtain a continuous distribution of sizes. Then the entire group of beads is sent through a riffle-type of sample divider which divides the material into two equal parts. Each of the two parts is again subdivided and so on until the desired number of sub-samples are obtained. Then a certain number of the final number of samples are tested in a certain way, to be described, in order to determine the distribution of particle sizes.

In order to calibrate standard sieves according to the present invention it is necessary to provide a calibrated sample of spherical material.

Other uses and advantages of the invention will become apparent upon reference to the specification and drawings.

Figure 1 is a drawing showing the method employed to reduce errors due to the sampling device.

Figure 2 is a showing of the calibration graph that is provided with each sample of beads.

Figure 3 is a plot of two sieve analyses of the same sample with two sets of sieves.

The spherical shape was chosen primarily to eliminate any doubt or question about "average" diameter or the orientation of the particle in passing the sieve opening. The spheres were not intended to be representative of the particles to be used on the sieves, nor is their diameter to be considered equal to the average diameter of irregular particles which might be sieved on the same sieve.

Glass was chosen as the material for the beads because its hardness minimizes abrasion and because spheres of glass were readily available. However, any material with the proper resistance to abrasion, such as special carbon spheres, may be used. Glass beads of the type used for highway markings are a suitable source of glass spheres for sizes from 80 to 1000 microns (sieves No. 170 through 18). Larger and smaller sizes of glass spheres are without doubt being made for other purposes, and a wider range of sieve sizes could be covered if desired.

The glass beads for highway markings as purchased are not all spherical nor are the sizes continuous. It was necessary to separate the spherical particles from the elliptical, tear drop, dumbbell, and jagged pieces. The spherical shapes were effectively separated from the other shapes by rolling the particles down a gentle incline.

The spheres roll true while non-spheres either roll in curves or not at all.

In order to obtain spheres of a continuous size distribution the material selected as spheres was carefully sieved into the closest sieve fractions ($\sqrt[4]{2}$ series)

and then equal weights of each fraction were used in the final mixture. This procedure produces a particle size distribution which in the differential form is hyperbolic and in the integral form is logarithmic. In this way equal weights of beads will be retained on each sieve. If other distributions are found desirable it would be merely a matter of mathematical calculation to determine the new particle size distribution. The logarithmic particle size distribution was chosen because the accuracy of the measurement of the sieve openings is the same for all sizes.

The continuity of each sieve fraction was checked by withdrawing a sample of beads from each sieve and applying a condensed version of the calibration procedure to be explained later in the specification. Whenever a deficit was found, beads of the proper size were added.

A convenient total weight of spheres in the final calibrated sample is about 100 grams. The total number of samples prepared from a master sample was 256 (equal to $2^8$) which required about 56 pounds of glass spheres having a continuous range of sizes in the proper proportions. After the master sample had been assembled and the preliminary check calibration indicated that the particle size distribution would be satisfactory, the individual samples were prepared. A "Boerner Sampler" was used as the sample reduction device. It is a riffle type apparatus with a funnel, gate, and chute attached above leading down to the compartments, which are arranged circularly. This machine divides the beads into two approximately equal groups by allowing the beads to roll down a slope into the circular sequence of compartments. The beads will fall into one compartment or the other purely by chance. The beads falling into one set of alternately neighboring compartments come out of the machine at a different place than those falling into the other set. The combination of gate and chute makes it impossible to feed too fast or to feed at the wrong angle. It has been found to give at least as good results as any known sample-reducing device or technique. As an additional precaution to neutralize any errors of the sampling device, careful attention was paid to the side of the sampler from which the samples emerged. Although 256 samples were desired, 512 samples were first made; and these were recombined in pairs so that the final sample represented equal quantities of material from each side of the sampler. This can perhaps be explained better with reference to Figure 1. The master sample is put into a riffle which divides it into two parts $A_1$ and $A_2$; $A_1$ coming out of one side of the machine, say the left side and $A_2$ coming out of the right side. $A_1$ is further divided into two parts $B_1$ and $B_2$, $B_1$ from the left and $B_2$ from the right. $B_1$ is further divided into 1 and 2, 1 from the left and 2 from the right. It is seen then that sample 1 always came down the left side of the riffle while sample 8 always came down the right. Both 1 and 8 contain half the amount needed for a complete sample. Therefore by mixing 1 and 8, a sample is obtained that came down each side an equal number of times. The table shows how this process is carried out for all of the samples obtained from the riffle.

It was recognized that the essential problem in calibration was adequate sampling although the spheres were divided into 256 samples by the best means available, it must be admitted that all 256 samples may not be exactly identical. Every twenty-fifth sample in the orderly arrangement of numbers given to the samples was chosen as a sample of the 256, making ten in all. Each of these ten samples contains approximately ten million spheres; therefore, they must be further sampled to obtain a practical number of spheres small enough to measure. Because spheres of approximately the same size do not tend to segregate and thus present an easier problem of measurement, each of the ten samples was separated into 14 sieve fractions by the use of ordinary standard sieves.

The spheres for the actual measurement of diameters were mounted on a gelatine-coated microscope slide. In order to make sure that an adequate sample was obtained from each sieve fraction, four different slides were prepared, each slide representing particles from a different portion of the sample container. Twenty-five particles chosen at random from each slide were measured. A total of 14,000 particles were measured for the ten samples.

The diameters were measured to the nearest 2 to 5 per cent, depending upon the part of the scale in use. The particle size distribution which is the ultimate aim of the diameter measurements can be defined with sufficient accuracy by about 90 points in the range of 60 to 1200 microns, averaging about 5 points within the range between each pair of series of the $\sqrt[4]{2}$ series. Therefore the interval of the diameter measurements should be adjusted so that all the sizes of beads present are measured in about 90 different size classes. The diameter class interval must be made smaller for the smaller sizes in order to obtain accuracy in this region. Therefore in the region of from 1200 to 430 microns the diameters were divided into groups with intervals between the groups of 21 microns. Therefore the groups were 430 microns, 451, 472, etc. In the size range of 430 to 160 microns the class interval was 8 microns, and from 160 to 60 microns the interval was 1.6 microns. It should be noted that the interval is never more than 5 per cent of the measured diameter. Eighty-eight points were obtained in the range 60 and 1200 microns, averaging about five points within the range between each pair of sizes of the $\sqrt[4]{2}$ series.

The measurements were made from the projection of the images of the particles on a convenient screen. The magnifications and projection distances were arranged so that the projections of the particles were between 6 and 30 centimeters in diameter.

In order to speed the measurement, a scale was drawn on a separate piece of paper that could be moved about the screen. The distance between the microscope and the image was adjusted so that the graduations on the hand scale exactly coincided with the projected scale in the eye piece. The hand scale could then be moved about and several beads near the center of the screen could be measured very rapidly. Two people working together measured 25 particles in about two minutes. Counting time for changing slides, preparing samples, and relaxation to prevent eyestrain, 300 or 400 particles were measured per hour.

The measurements of the diameter of each sphere were recorded in terms of the projected scale reading. To calculate the weight fraction finer than each size, the first step was to determine the diameter frequency distribution within the 100 spheres representing one sieve fraction of one sample. The actual diameter for each size was evaluated by multiplying the scale reading by the magnification factor. These computations give a number-size distribution. On the assumption that all the particles were of the same density and same shape, the weight is proportional to the number of particles $n$ and to their diameter cubed. The weight fraction of spheres of diameter $d$ in the sieve fraction thus becomes $nd^3/\Sigma nd^3$. If $w$ is the weight of the sieve fraction and $\Sigma w$ the total weight of the sample, then $w/\Sigma w$ is the weight fraction of the sieve fraction in the total sample. The weight fraction $f$ of spheres of diameter $d$ in the total sample is $$f = \frac{nd^3}{\Sigma nd^3} \times \frac{w}{\Sigma w}$$

An example of the frequency distribution, diameters, and the computations leading to the weight fraction is given in the table.

TABLE

*Computation of weight fraction from measured diameters of 100 particles*

| Measured diameter scale units | Diameter [d] (microns) | Number [n] | $d^3 \times 10^5$ | $nd^3 \times 10^5$ | $f$ |
|---|---|---|---|---|---|
| 2.10 | 879.9 | 1 | 6812 | 6812 | 0.0011 |
| 2.05 | 859.9 | 4 | 6337 | 25348 | .0040 |
| 2.00 | 838.0 | 8 | 5885 | 47080 | .0074 |
| 1.95 | 817.1 | 9 | 5454 | 96166 | .0151 |
| 1.90 | 796.1 | 17 | 5045 | 85765 | .0135 |
| 1.85 | 775.2 | 20 | 4658 | 93160 | .0146 |
| 1.80 | 754.2 | 29 | 4290 | 124410 | .0195 |
| 1.75 | 733.3 | 9 | 3942 | 35478 | .0056 |
| 1.70 | 712.3 | 2 | 3614 | 7228 | .0011 |
| 1.65 | 691.4 | 1 | 3304 | 3304 | .0005 |
| | | $\Sigma=100$ | | $\Sigma=524751$ | $\Sigma=.0824$ |

$$f = \frac{nd^3}{\Sigma nd^3} \times \frac{w}{\Sigma w} = 1.5709 \times 10^{-12} nd^3$$

where $$\frac{w}{\Sigma w} = .0824$$

The method of calibrating the sieves is as follows:

The entire specimen of spherical beads obtained by the method of the present invention is placed on the sieve to be calibrated, the sieve is shaken until the rate of passage of beads through the sieve is practically zero and then the beads that have passed a sieve are carefully weighed. Initially the weight of the entire sample had been determined so that now that the weight of the part that did not pass the sieve is known, it is a simple matter to take the next step which is to determine the percentage by weight of beads that did not pass the sieve, or, expressing it another way, the weight percent coarser than the sieve. In this particular case the weight percent coarser was used; however, the calibration would equally well be expressed in terms of percent finer.

A calibration curve of the type shown in Figure 2 is provided with each sample of beads. The abscissa is the effective sieve opening in microns and the ordinate is the weight percent coarser than the sieve. Therefore with the weight percent coarser already determined in the above method it is a simple matter to go to the calibration chart and to determine the effective opening of the sieve in microns. Thus if 20 percent of the sample did not pass the sieve, then the effective opening of the sieve is 750 microns.

The way in which this method of calibrating sieves will greatly reduce the variations in sieve analysis is demonstrated below. In this example the weight percent finer is used as a basis rather than the weight percent coarser.

An analysis of an unknown specimen is made by a set of sieves calibrated as described above. Then a graph is made showing the percentage of the total weight passed by each sieve as a function of its effective opening in microns. This is shown in Figure 1 as Set I. Then the specimen can be analyzed anywhere else by another set of sieves which is also calibrated according to its effective openings. It should be noted that the sieving to determine the effective opening of the second set of sieves and the sieving of the specimen should be done in the same manner as was used in the initial determination; that is, the calibrated sample and the unknown sample should be subjected to the same shaking motion for the same length of time as was used for analyzing the unknown specimen in the first instance to obtain the Set I curve. The analysis made by the second set of sieves is plotted on the same graph as Set I, and is designated as Set II. As can be seen, the two graphs correspond very closely and therefore the analyses of the specimens made with two sets of sieves give the same result to a very close approximation. However, if the nominal sieve openings had been used as a basis, the values obtained would have varied quite considerably. The nominal sieve openings are indicated by the arrows in the graph. The arrow numbered 40 designates the location of U. S. Standard Sieve No. 40. In this analysis the percentage of the weight of the specimen retained in sieve 40 (percent finer than 40 less percent finer than 35) of Set I as taken from the graph is 10.5, and the percentage retained on sieve 40 of Set II is 7.0. This represents quite a large variation when compared with the results obtained when the calibration techniques of the present invention are used.

It will be apparent that the embodiments shown are only exemplary and that various modifications can be made within the scope of our invention as defined in the appended claims.

We claim:

1. The method of calibrating sieves according to their effective openings which comprises the steps of placing a calibrated sample of spherical beads, having a particle size distribution which in the differential form is hyperbolic and in the integral form is logarithmic, on the sieves, shaking the sieves for the same length of time that said sieves will be shaken when used to measure an unknown sample, and weighing the fraction of the sample retained on each sieve.

2. The method of calibrating sieves according to their effective openings which comprises the steps of placing a predetermined amount of spherical beads having a predetermined size distribution on the sieves, shaking the sieves until the rate of passage of beads through said sieves is practically zero, the time of shaking being the same as when said sieves are used to measure an unknown sample, and weighing the fraction of the sample retained on each sieve.

3. The method of calibrating sieves according to their effective openings which comprises the steps of placing a calibrated sample of spherical beads having a predetermined size distribution on the sieves, shaking the sieves until the rate of passage of beads through said sieves is practically zero, the time of shaking being the same as when said sieves are used to measure an unknown sample, weighing the fraction of the sample retained on each sieve and determining from the relative weights retained on each sieve the effective openings of the sieves.

4. As an article of manufacture a package containing a predetermined amount of spherical beads for use in calibrating sieves according to their effective openings which beads have a particle size distribution which in the differential form is hyperbolic and in the integral form is logarithmic.

5. As an article of manufacture for use in calibrating a set of standard graded sieves according to their effective openings, a package containing a predetermined weight of spherical beads whose weight-size distribution is such that an equal weight of beads is retained on each sieve of a standard graded set of sieves.

References Cited in the file of this patent

Technologic Paper No. 42, U. S. B. S., R. J. Wig and J. C. Pearson, "Standardization of No. 200 Cement Sieves," July 1914.

The Profitable Use of Testing Sieves, Catalogue 48 of the W. S. Tyler Co., Cleveland, Ohio, 1926.

Micromerites, by J. M. Dallavalle, Pitman Pub. Corp., 1943, chapters 3, 4, 5; pp. 471–472 (ch. 22); and pp. 486–492 (ch. 23).